(12) United States Patent
Muramatsu (10) Patent No.: US 11,293,656 B2
(45) Date of Patent: Apr. 5, 2022

(54) AIR CONDITIONER

(71) Applicant: Mitsubishi Electric Corporation, Tokyo (JP)

(72) Inventor: Satoru Muramatsu, Tokyo (JP)

(73) Assignee: Mitsubishi Electric Corporation, Tokyo (JP)

(\*) Notice: Subject to any disclaimer, the term of this patent is extended or adjusted under 35 U.S.C. 154(b) by 675 days.

(21) Appl. No.: 15/529,148

(22) PCT Filed: Feb. 24, 2015

(86) PCT No.: PCT/JP2015/055287
§ 371 (c)(1),
(2) Date: May 24, 2017

(87) PCT Pub. No.: WO2016/135866
PCT Pub. Date: Sep. 1, 2016

(65) Prior Publication Data
US 2017/0261218 A1    Sep. 14, 2017

(51) Int. Cl.
*F24F 11/30* (2018.01)
*F24F 11/62* (2018.01)
*G05B 15/02* (2006.01)
*F24F 11/56* (2018.01)
*F24F 11/59* (2018.01)

(52) U.S. Cl.
CPC .............. *F24F 11/30* (2018.01); *F24F 11/62* (2018.01); *G05B 15/02* (2013.01); *F24F 11/56* (2018.01); *F24F 11/59* (2018.01); *G05B 2219/2614* (2013.01)

(58) Field of Classification Search
CPC .. F24F 11/62; F24F 11/30; F24F 11/56; F24F 11/59; G05B 15/02; G05B 2219/2614
See application file for complete search history.

(56) References Cited

U.S. PATENT DOCUMENTS

| 5,276,630 A | 1/1994 | Baldwin et al. |
| 7,044,397 B2 | 5/2006 | Bartlett et al. |

(Continued)

FOREIGN PATENT DOCUMENTS

| CN | 1987254 A | 6/2007 |
| EP | 1 947 543 A1 | 7/2008 |

(Continued)

OTHER PUBLICATIONS

Office action dated Mar. 14, 2018 issued in corresponding EP patent application No. 15868653.5.

(Continued)

*Primary Examiner* — Tejal Gami
(74) *Attorney, Agent, or Firm* — Posz Law Group, PLC (57) ABSTRACT

A switch for switching a function setting of an air conditioner and a memory that stores therein a setting value of the function setting are provided. The setting value stored in the memory is rewritable according to an instruction from a remote controller. The function setting of the air conditioner is defined by the setting value stored in the memory. Regarding functions set in the air conditioner, priority as to whether to give priority to setting with the switch or to validate setting with the remote controller is switched for each function according to setting from the remote controller.

16 Claims, 11 Drawing Sheets

(56) References Cited

U.S. PATENT DOCUMENTS

| | | |
|---|---|---|
| 7,475,828 B2 | 1/2009 | Bartlett et al. |
| 2006/0004492 A1 | 1/2006 | Terlson et al. |
| 2007/0225868 A1 | 9/2007 | Terlson et al. |
| 2008/0217417 A1* | 9/2008 | Hatano ............ F24F 11/83 236/51 |
| 2013/0345881 A1 | 12/2013 | Leise et al. |
| 2015/0032268 A1 | 1/2015 | Ino et al. |

FOREIGN PATENT DOCUMENTS

| | | |
|---|---|---|
| EP | 1 980 799 B1 | 1/2011 |
| EP | 1 548 375 B1 | 7/2011 |
| EP | 1 980 795 B1 | 6/2013 |
| JP | 05-322286 A | 12/1993 |
| JP | 06-327067 A | 11/1994 |
| JP | 08-100942 A | 4/1996 |
| JP | 11-083132 A | 3/1999 |
| JP | 2002-228176 A | 8/2002 |
| JP | 2004-069091 A | 3/2004 |
| JP | 2004-092996 A | 3/2004 |
| JP | 2011231973 A | 11/2011 |
| JP | 201272968 A | 4/2012 |
| JP | 2013-133985 A | 7/2013 |
| JP | 2013-228185 A | 11/2013 |
| JP | 2013-238340 A | 11/2013 |

OTHER PUBLICATIONS

International Search Report of the International Searching Authority dated Jun. 2, 2015 for the corresponding International application No. PCT/JP2015/055287 (and English translation).

Communication pursuant to Article 94(3) EPC dated Feb. 20, 2017 for the corresponding European application No. 15 868 653.5.

Office Action dated Oct. 3, 2017 issued in corresponding Japanese application No. 2017-501612 ( and English machine translation thereof).

Office Action dated Mar. 29, 2019 issued in corresponding CN patent application No. 201580072705.7 (and English translation).

Office Action dated Jul. 22, 2019 issued in corresponding CN patent application No. 201580072705.7 (and English translation).

* cited by examiner

| FUNCTION SETTING NUMBER WITH REMOTE CONTROLLER | SETTING ITEM | TARGET DIP_SW |
|---|---|---|
| 8 | CEILING HEIGHT SETTING | SW1-1, 1-2 |

INITIAL-VALUE SETTING EXAMPLE OF FUNCTION SETTING No. 8
(CEILING HEIGHT SETTING)

| FUNCTION SETTING VALUE MEMORY DATA | SETTING CONTENTS | DIP_SW SETTING | |
|---|---|---|---|
| 1 | LOW CEILING | SW1-1=ON, SW1-2=OFF | |
| 2 | STANDARD | SW1-1=OFF, SW1-2=OFF | DIP_SW SHIPMENT SETTING |
| 3 | HIGH CEILING | SW1-1=OFF, SW1-2=ON | |

| FUNCTION SETTING NUMBER WITH REMOTE CONTROLLER | SETTING ITEM |
|---|---|
| 32 | FUNCTION-SETTING PRIORITY SWITCHING |

SETTING VALUE CONFIGURATION OF FUNCTION SETTING No. 32

| FUNCTION SETTING VALUE MEMORY DATA | SETTING CONTENTS | |
|---|---|---|
| 1 | VALIDATE DIP_SW SETTINGS | INITIAL SETTING |
| 2 | VALIDATE REMOTE CONTROLLER SETTINGS | |

EXAMPLE OF SETTING VALUE CHANGE AT TIME OF
FUNCTION SETTING CHANGE WITH REMOTE CONTROLLER

| FUNCTION SETTING NUMBER WITH REMOTE CONTROLLER | SETTING ITEM | TARGET DIP_SW |
|---|---|---|
| 8 | CEILING HEIGHT SETTING | SW1-1, 1-2 |

(1) FUNCTION SETTING No. 32 =1 (WHEN DIP_SW SETTINGS ARE VALID)

| FUNCTION SETTING VALUE MEMORY DATA | SETTING CONTENTS | DIP_SW SETTING | |
|---|---|---|---|
| 1 | LOW CEILING | SW1-1=ON, SW1-2=OFF | |
| 2 | STANDARD | SW1-1=OFF, SW1-2=OFF | DIP_SW SHIPMENT SETTINGS ARE VALID |
| 3 | HIGH CEILING | SW1-1=OFF, SW1-2=ON | |

(2) FUNCTION SETTING No. 32 =2 (WHEN REMOTE CONTROLLER SETTINGS ARE VALID)
SETTING VALUE OF FUNCTION SETTING No. 8 IS SAME AS INITIAL VALUE OF DIP_SW SETTING, SETTING VALUE =2

| FUNCTION SETTING VALUE MEMORY DATA | SETTING CONTENTS | DIP_SW SETTING | |
|---|---|---|---|
| 1 | LOW CEILING | SW1-1=ON, SW1-2=OFF | |
| 2 | STANDARD | SW1-1=OFF, SW1-2=OFF | FUNCTION SETTING VALUES ARE VALID SAME AS IN DIP_SW SETTING STATE |
| 3 | HIGH CEILING | SW1-1=OFF, SW1-2=ON | |

(3) FUNCTION SETTING No. 32 =2 (WHEN REMOTE CONTROLLER SETTINGS ARE VALID)
CASE OF CHANGE OF FUNCTION SETTING No. 8 =2 (STANDARD) → 3 (HIGH CEILING)

| FUNCTION SETTING VALUE MEMORY DATA | SETTING CONTENTS | DIP_SW SETTING | |
|---|---|---|---|
| 1 | LOW CEILING | SW1-1=ON, SW1-2=OFF | |
| 2 | STANDARD | SW1-1=OFF, SW1-2=OFF | DIP_SW SETTING STATE |
| 3 | HIGH CEILING | SW1-1=OFF, SW1-2=ON | REMOTE-CONTROLLER CHANGE- FUNCTION SETTING VALUES ARE VALID |

EXAMPLE OF SETTING VALUE CHANGE AT TIME OF
FUNCTION SETTING CHANGE WITH REMOTE CONTROLLER

FIG.14

| FUNCTION SETTING NUMBER WITH REMOTE CONTROLLER | SETTING ITEM | TARGET DIP_SW |
|---|---|---|
| 8 | CEILING HEIGHT SETTING | SW1-1, 1-2 |

(1) SHIPMENT STATE SETTING OF FUNCTION SETTING No. 8

| FUNCTION SETTING VALUE MEMORY DATA | SETTING CONTENTS | DIP_SW SETTING | |
|---|---|---|---|
| 1 | LOW CEILING | SW1-1=ON, SW1-2=OFF | |
| 2 | STANDARD | SW1-1=OFF, SW1-2=OFF | DIP_SW SHIPMENT SETTINGS ARE VALID |
| 3 | HIGH CEILING | SW1-1=OFF, SW1-2=ON | |

(2) CASE OF CHANGE TO FUNCTION SETTING No. 8 =3 (HIGH CEILING) WITH REMOTE CONTROLLER

| FUNCTION SETTING VALUE MEMORY DATA | SETTING CONTENTS | DIP_SW SETTING | |
|---|---|---|---|
| 1 | LOW CEILING | SW1-1=ON, SW1-2=OFF | |
| 2 | STANDARD | SW1-1=OFF, SW1-2=OFF | DIP_SW SHIPMENT SETTING |
| 3 | HIGH CEILING | SW1-1=OFF, SW1-2=ON | REMOTE-CONTROLLER SETTING-FUNCTION SETTING VALUES ARE VALID |

(3) CASE OF CHANGE OF DIP_SW SETTING CORRESPONDING TO FUNCTION SETTING No. 8 TO LOW CEILING AFTER (2)

| FUNCTION SETTING VALUE MEMORY DATA | SETTING CONTENTS | DIP_SW SETTING | |
|---|---|---|---|
| 1 | LOW CEILING | SW1-1=ON, SW1-2=OFF | DIP_SW CHANGE SETTINGS ARE VALID |
| 2 | STANDARD | SW1-1=OFF, SW1-2=OFF | |
| 3 | HIGH CEILING | SW1-1=OFF, SW1-2=ON | |

AIR CONDITIONER

CROSS REFERENCE TO RELATED APPLICATION

This application is a U.S. national stage application of International Patent Application No. PCT/JP2015/055287 filed on Feb. 24, 2015, the disclosure of which is incorporated herein by reference.

TECHNICAL FIELD

The present invention relates to an air conditioner configured to be capable of storing therein a setting value of a function setting.

BACKGROUND

In an example of an air conditioner according to a conventional technique, setting switching of function settings of the air conditioner is performed by using a DIP switch on a control board.

In another example of an air conditioner according to a conventional technique, function setting values stored in an EEPROM on a control board are changed by using a remote controller (for example, Patent Literature 1 listed below).

PATENT LITERATURE

Patent Literature 1: Japanese Patent Application Laid-open No. H11-83132

However, in the case of the air conditioner using the DIP switch on the control board, an operation of opening an electric component box housing the control board therein is required when the settings are to be switched. Accordingly, to perform the setting switching after completion of installation requires additional work and thus the settings cannot be switched easily, which is a problem.

In the case of the conventional air conditioner in which the function setting values stored in the EEPROM on the control board are changed with the remote controller, the settings cannot be changed before completion of installation when the air conditioner cannot be energized, which is a problem.

SUMMARY

The present invention has been achieved in view of the above problems, and an object of the present invention is to provide an air conditioner that can easily perform setting switching of function setting of the air conditioner either before or after completion of installation.

In order to solve the above problems and to achieve the above object, the present invention is provided with a switch to switch a function setting of an air conditioner, and a memory to store therein a setting value of the function setting. The setting value stored in the memory is rewritable according to an instruction from a remote controller. The function setting of the air conditioner is defined by the setting value stored in the memory.

Advantageous Effects of Invention

According to the present invention, it is possible to easily perform setting switching of function setting of the air conditioner either before or after completion of installation.

DETAILED DESCRIPTION

Exemplary embodiments of an air conditioner according to the present invention will be explained below in detail with reference to the accompanying drawings. The present invention is not limited to the embodiments.

First Embodiment

Figure 1:
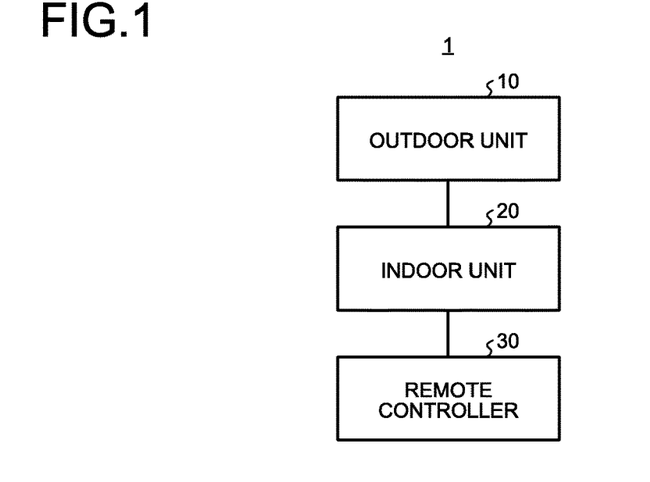
FIG. 1 is a system configuration diagram of an air conditioner according to a first embodiment.
Figure 2:
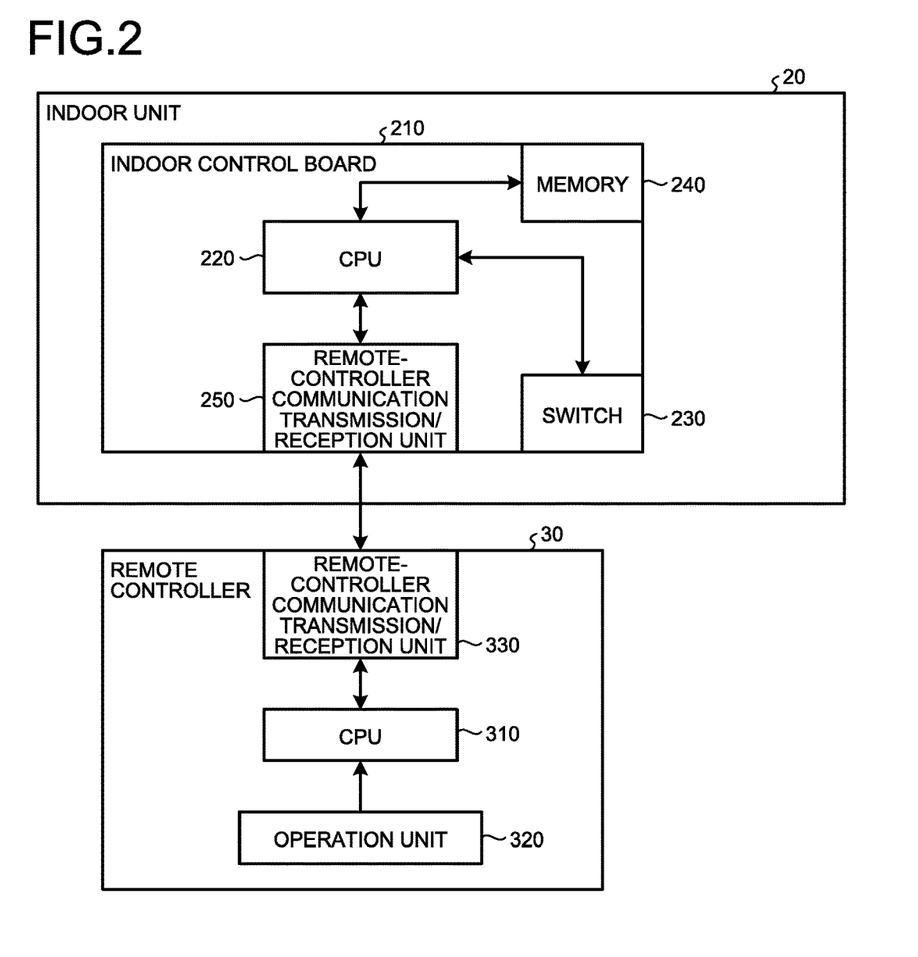
FIG. 2 is a functional block diagram illustrating a functional configuration of an indoor unit and a remote controller according to the first embodiment.
Figure 3:
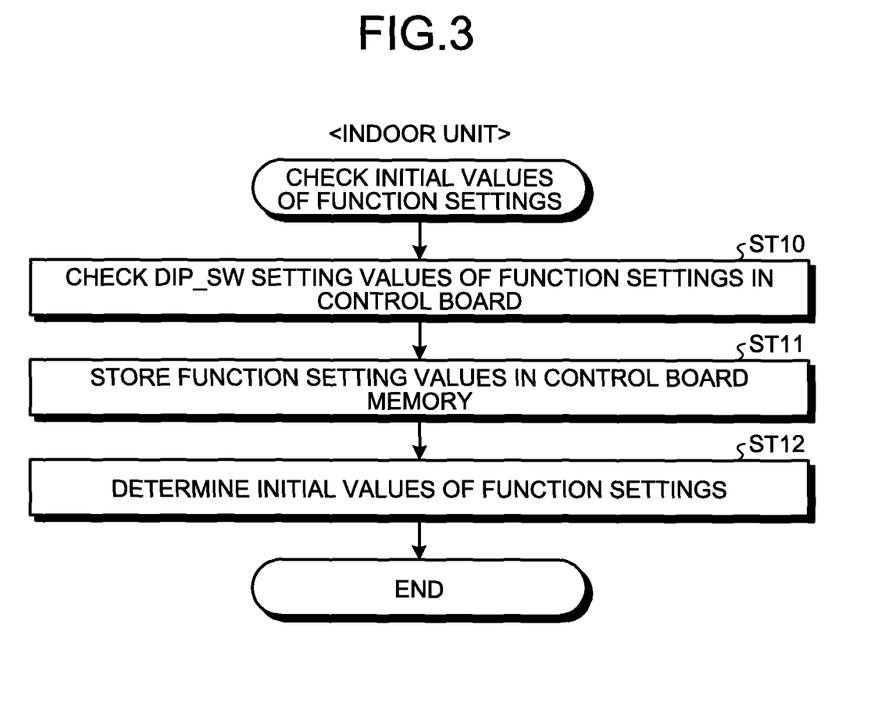
FIG. 3 is a flowchart illustrating a control flow related to determination of initial values of function settings according to the first embodiment.
Figure 4:
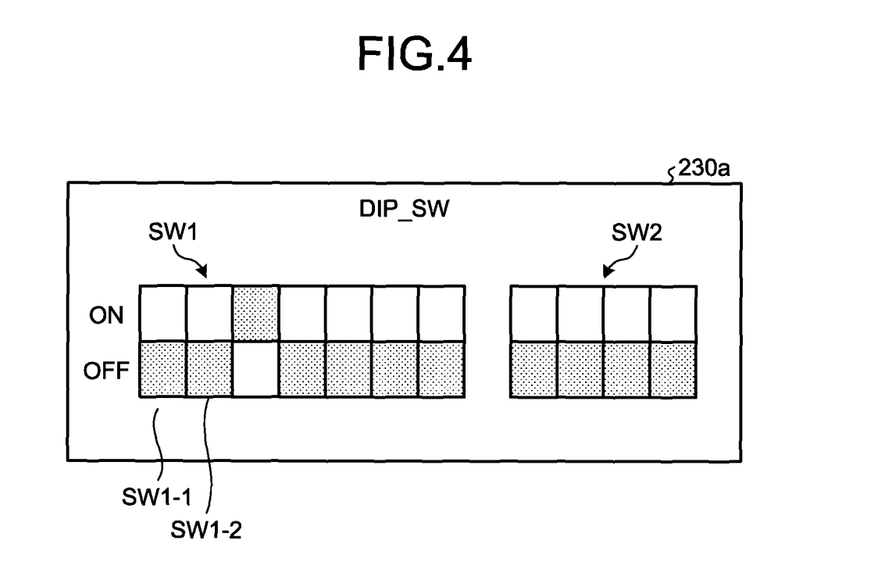
FIG. 4 is a diagram illustrating a general view of a DIP_SW as an example of a switch.
Figure 5:
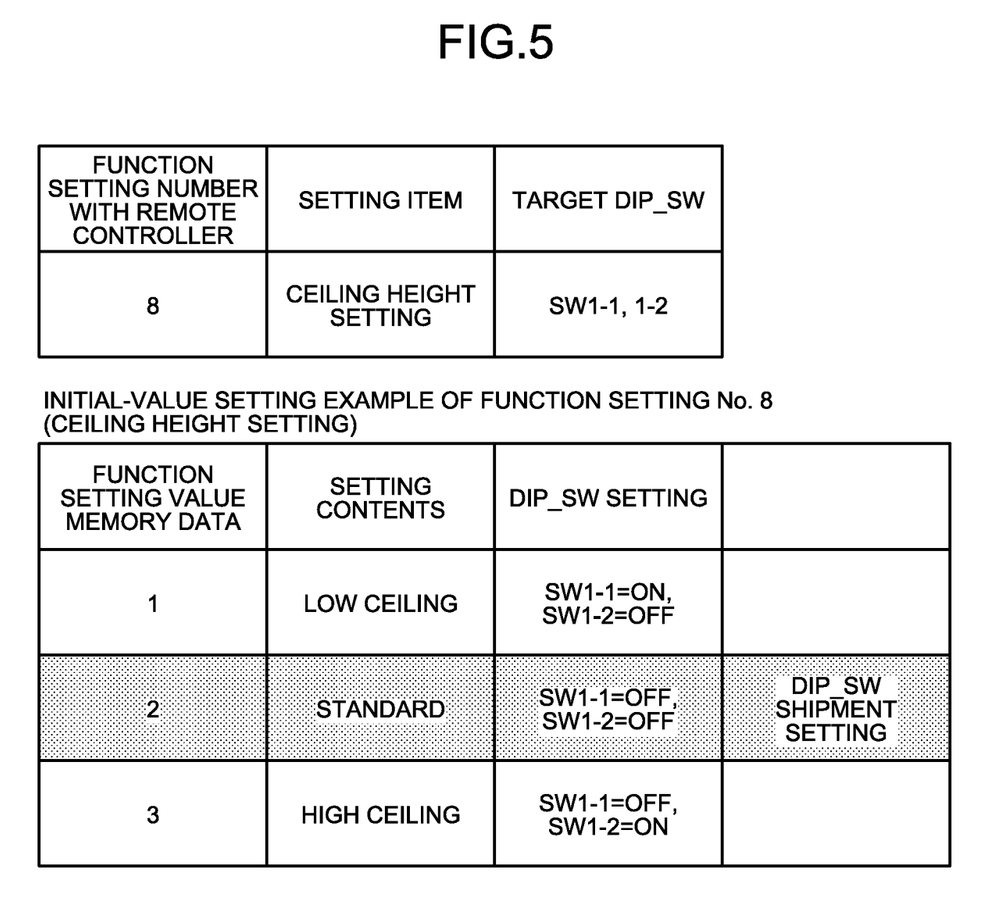
FIG. 5 is a diagram illustrating, in a table form, contents of a memory that stores therein initial values of function settings.
Figure 6:
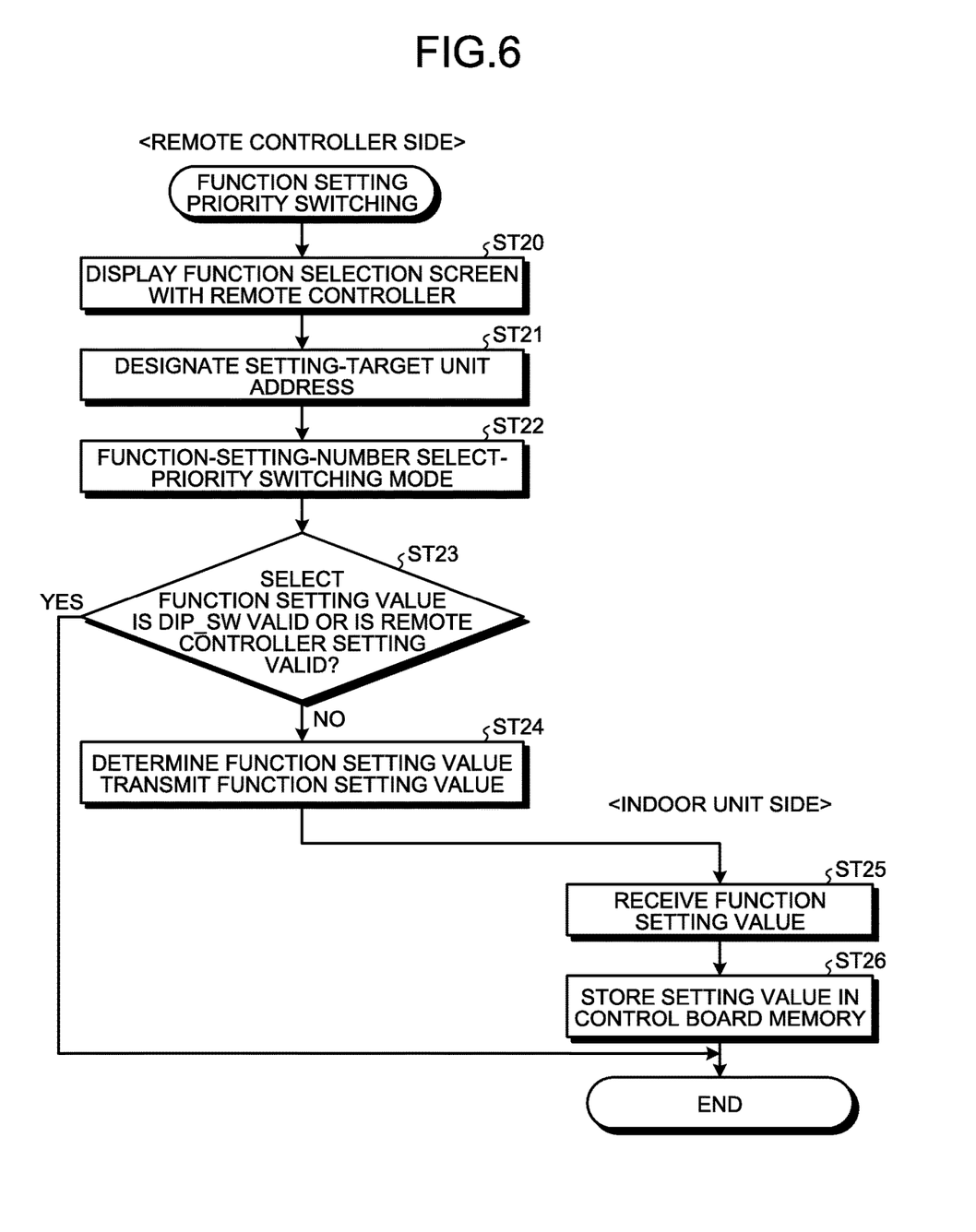
FIG. 6 is a flowchart illustrating a control flow for setting a priority switching mode related to function settings.
Figure 7:
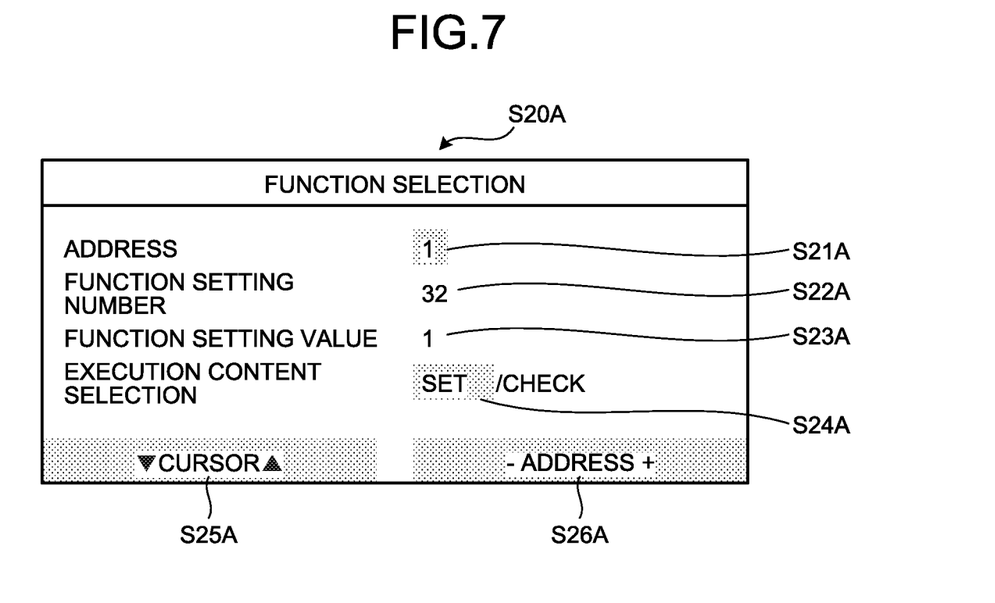
FIG. 7 is a diagram illustrating a function selection screen at a time of setting the priority switching mode related to the function settings.
Figure 8:
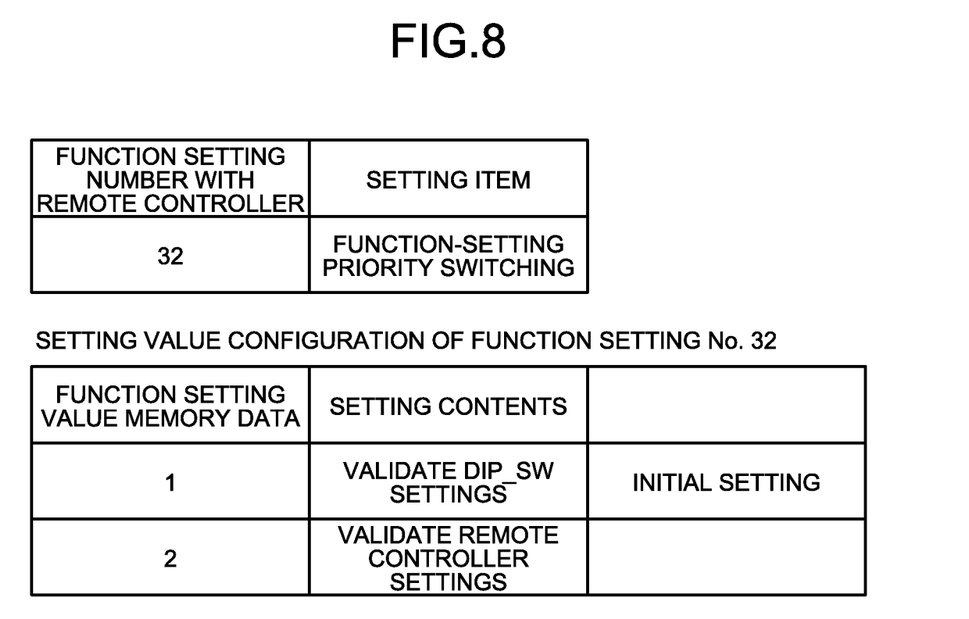
FIG. 8 is a diagram illustrating, in a table form, setting values at a time of setting the priority switching mode related to the function settings.
Figure 9:
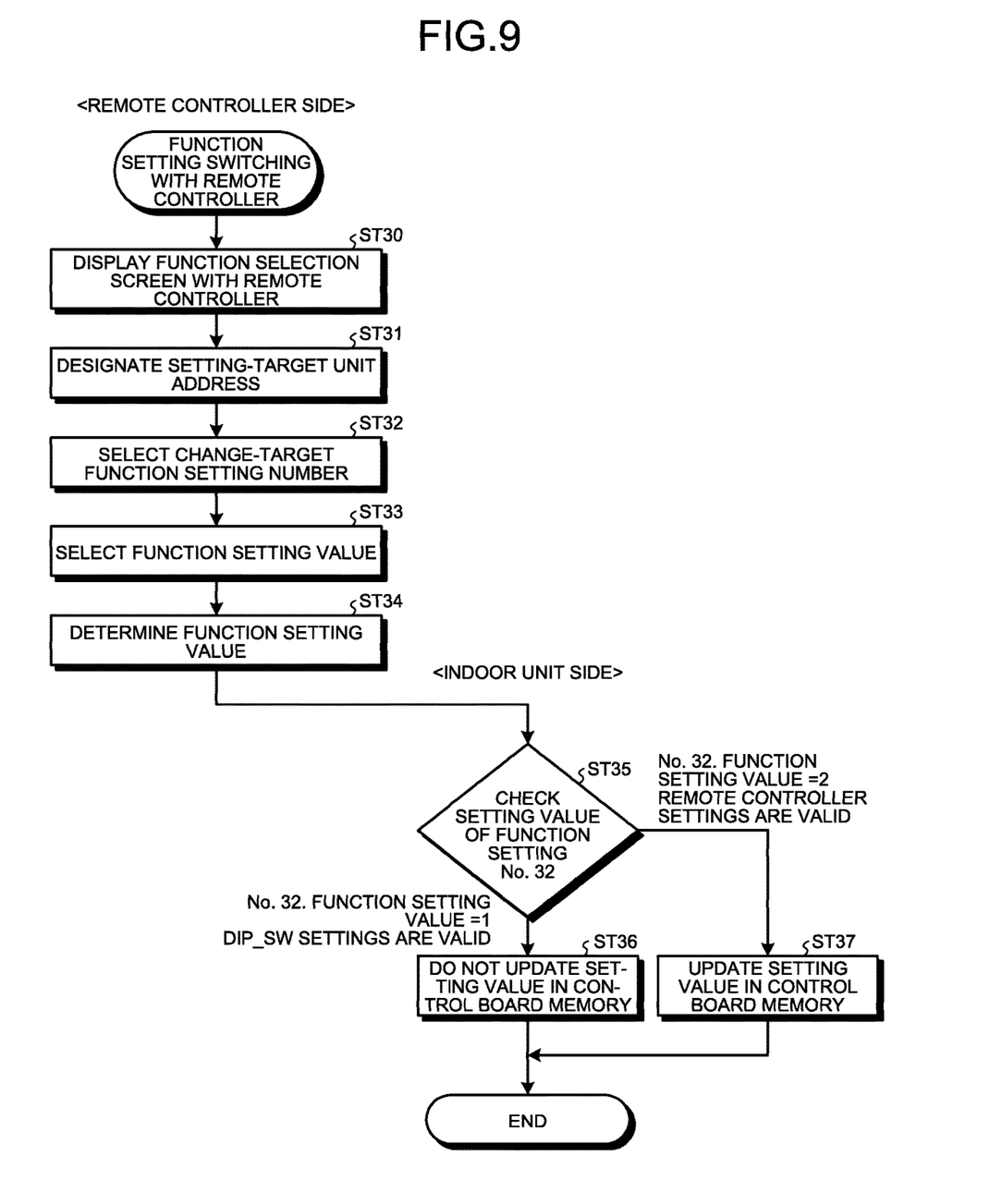
FIG. 9 is a flowchart illustrating a control flow at a time of changing a function setting value with a remote controller in the priority switching mode related to the function settings.
Figure 10:
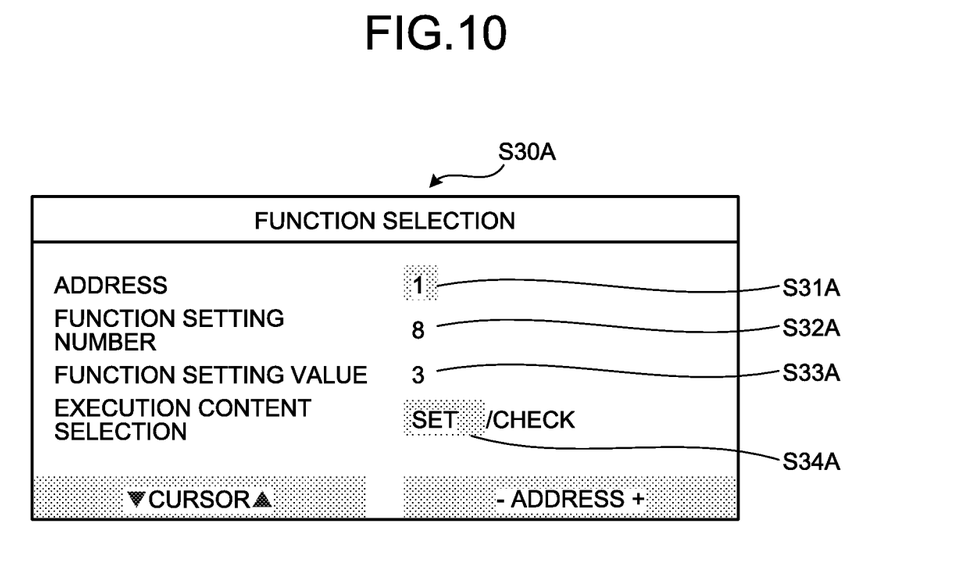
FIG. 10 is a diagram illustrating a function-setting selection screen displayed on a remote controller.
Figure 11:
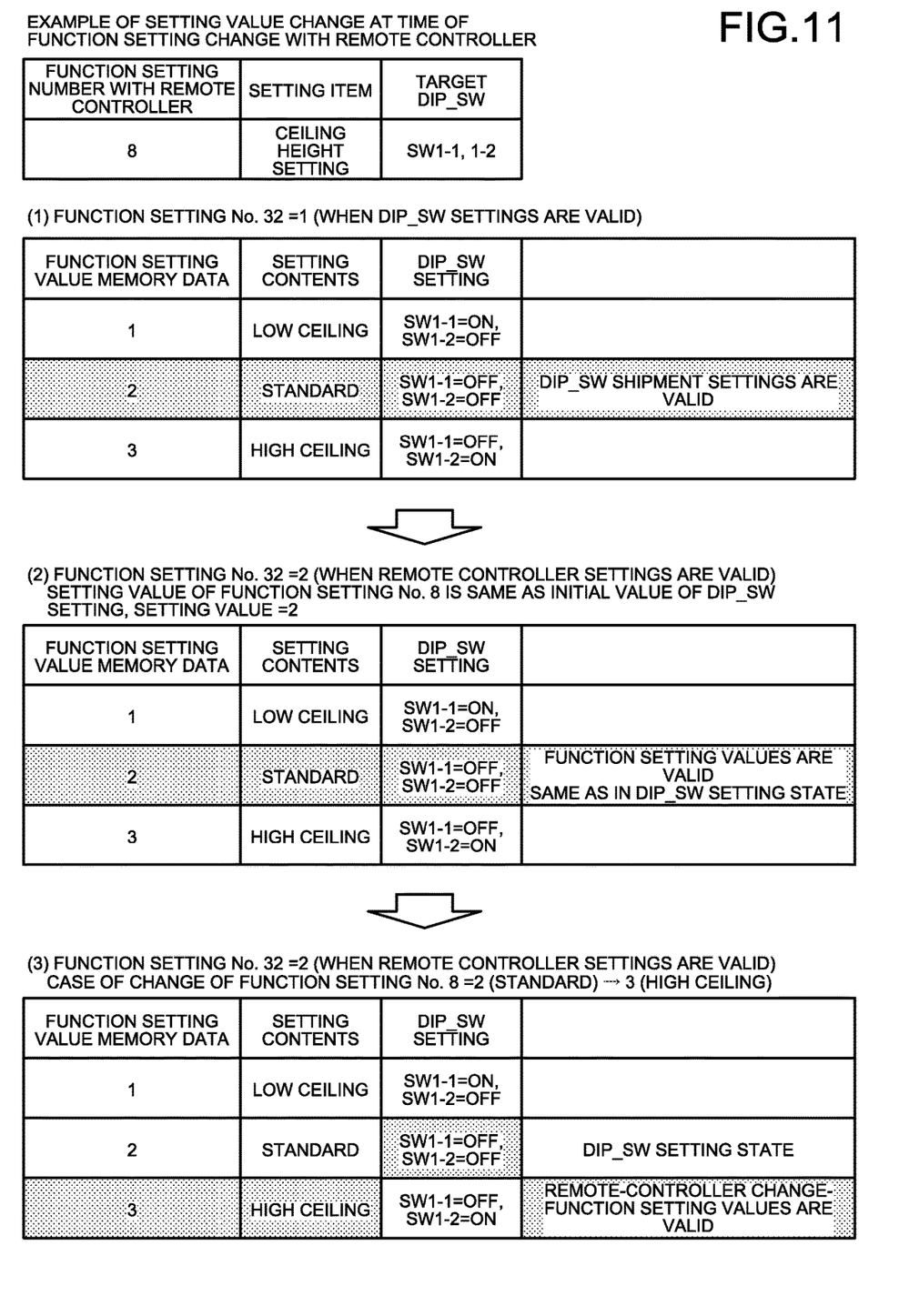
FIG. 11 is a diagram illustrating an example of a setting value change at a time of changing the function setting value.

A configurations and an operation of an air conditioner according to a first embodiment will be described with reference to FIGS. 1 to 11. FIG. 1 is a system configuration diagram of the air conditioner according to the first embodiment. FIG. 2 is a functional block diagram illustrating a functional configuration of an indoor unit and a remote controller according to the first embodiment. FIG. 3 is a flowchart illustrating a control flow related to determination of initial values of function settings according to the first embodiment. FIG. 4 is a diagram illustrating a general view of a DIP switch (hereinafter, DIP_SW) as an example of a switch. FIG. 5 is a diagram illustrating, in a table form, contents of a memory that stores therein initial values of function settings. FIG. 6 is a flowchart illustrating a control flow for setting a priority switching mode related to function settings. FIG. 7 is a diagram illustrating a function selection screen at a time of setting the priority switching mode related to the function settings. FIG. 8 is a diagram illustrating, in a table form, setting values at a time of setting the priority switching mode related to the function settings. FIG. 9 is a flowchart illustrating a control flow at a time of changing a function setting value with a remote controller in the priority switching mode related to the function settings. FIG. 10 is a diagram illustrating a function-setting selection screen displayed on the remote controller. FIG. 11 is a diagram illustrating an example of a setting value change at a time of changing a function setting value.

The configuration of the air conditioner according to the first embodiment is described first. As illustrated in FIG. 1, an air conditioner 1 according to the first embodiment is configured to include an outdoor unit 10 operating as an outdoor machine of the air conditioner 1, an indoor unit 20 operating as an indoor machine of the air conditioner 1, and a remote controller 30 that remotely controls the indoor unit 20.

FIG. 2 illustrates an internal functional block of an indoor control board 210 having a function of a controller in the indoor unit 20, and an internal functional block of the remote controller 30. The indoor control board 210 is provided with a CPU 220 serving as a processing processor of the indoor unit 20, a switch 230 for performing function settings, a memory 240 storing therein function setting data, and a remote-controller communication transmission/reception unit 250 performing communications with the remote controller 30. The remote controller 30 is provided with a CPU 310 serving as a processing processor of the remote controller 30, an operation unit 320, and a remote-controller communication transmission/reception unit 330 performing communications with the indoor unit 20.

In the indoor control board 210, various function settings of the air conditioner 1 can be switched by using the switch 230 provided in the indoor control board 210. In the indoor control board 210, it is also possible to rewrite contents of the memory 240 (hereinafter, appropriately referred to as "memory data") according to an instruction from the remote controller 30 and to switch the function settings by referring to the rewritten memory data. That is, the air conditioner 1 according to the first embodiment has a configuration capable of switching the function settings by whichever of setting switching with the switch 230 and setting switching with the remote controller 30.

Next, an operation of the air conditioner according to the first embodiment will be described. In the following descriptions, a case where the switch 230 is a DIP_SW illustrated in FIG. 4 is used as an example.

FIG. 3 illustrates a control flow performed until initial values for the function settings are determined in the indoor control board 210 of the indoor unit 20. First, setting values of the DIP_SW illustrated in FIG. 4 as function settings of the indoor unit 20 are checked (Step ST10). Next, the checked setting values of the DIP_SW are stored in the memory 240 of the indoor control board 210 (Step ST11). Due to the storing of the setting values of the DIP_SW in the memory 240 of the indoor control board 210, initial values regarding the function settings of the indoor unit 20 are determined (Step ST12).

FIG. 5 is a diagram illustrating, in a table form, an example of processing according to the control flow illustrated in FIG. 3. A setting item of a function setting and a setting number (hereinafter, denoted as "function setting No") used when designating a function with the remote controller 30 are indicated on an upper part of the diagram. In the example shown in FIG. 5, the setting item is "ceiling height setting". In the DIP_SW 230a, the "ceiling height setting" is set by "SW1-1" and "SW1-2". In the function setting with the remote controller 30, the setting item "ceiling height setting" is identified by the "function setting No" of "8". The setting values are stored in the memory 240.

Regarding the "ceiling height setting", three types of setting including "low ceiling", "standard", and "high ceiling" are possible by the setting with the DIP_SW 230a and the function setting with the remote controller 30. In the Step ST10 in FIG. 3, a setting value indicating that the setting content of the "ceiling height setting" is "standard", which is due to the setting of the DIP_SW 230a at the time of shipment, is confirmed. In the Step ST11, the setting value of "2" indicating the "standard" is stored, in the memory 240, as the setting value of the corresponding function setting No. 8. In this manner, the setting value related to the "ceiling height setting" is loaded into the memory 240.

The case of the "ceiling height setting" corresponding to the "function setting No. 8" has been exemplified in the example shown in FIGS. 3 and 4. The same applies to other functions, and it is possible to load into the memory 240 by designating the corresponding "function setting No".

Next, a control flow to switch priority of the function settings, that is whether the settings with the DIP_SW 230a are to be validated or the function settings with the remote controller 30 are to be validated at a time of switching the function settings will be described with reference to FIGS. 6 to 8.

First, a function selection screen S20A for setting various functions of the indoor unit 20 is displayed with the remote controller 30 (Step ST20 in FIG. 6, function selection screen S20A in FIG. 7). Next, an address indicating the indoor unit 20 as a setting target is designated on the function selection screen S20A (Step ST21 in FIG. 6, an address designation field S21A in FIG. 7). Subsequently, the "No. 32" being the "function setting No" indicating that the setting switching of priority of the function setting is to be performed is selected (Step ST22 in FIG. 6, a function setting field S22A in FIG. 7). Subsequently, a function setting value is selected to select whether the DIP_SW 230a is to be validated or settings with the remote controller 30 are to be validated (Step ST23 in FIG. 6, a function setting-value field S23A in FIG. 7). If the settings with the DIP_SW 230a are to be validated (YES at Step ST23), the flow processing shown in FIG. 6 is ended. If the settings with the remote controller 30 are to be validated (NO at Step ST23), the process proceeds to Step ST24. By the way, movement in the selection field can be achieved by using a downward-pointing triangle key and an upward-pointing triangle key located on both sides of a cursor field S25A, respectively. Decrease and increase of a numerical value in the setting field can be selected by using a "−" key and a "+" key on both sides of an address field S26A, respectively.

A configuration of the setting values of the function setting No. 32 for priority switching is illustrated in FIG. 8. To describe specifically, a setting value of "1" indicates that the settings with the DIP_SW 230a are valid while a setting value of "2" indicates that the values set with the remote controller 30 are valid. In the example illustrated in FIG. 7, the function setting value is "1" being an initial setting value and thus the settings with the DIP_SW 230a are validated.

Next, in order to execute the contents set in the processes at Steps ST21 to ST23, "set" is selected in an execution-content selection field S24A to determine the function setting value (Step ST24 in FIG. 6). Then, the determined function setting value is transmitted to the indoor control board 210 of the indoor unit 20 by a remote control communication between the remote controller 30 and the indoor unit 20.

The indoor control board 210 receives the function setting value determined by using the remote controller 30 (Step ST25 in FIG. 6), and the received function setting value is stored in a designated location in the memory 240 (Step ST26 in FIG. 6).

In the above-described example, the settings with the DIP_SW 230a are validated. It is also possible to validate the settings with remote controller 30 by setting the function setting value to "2" in the function setting-value field S23A at Step ST23 and selecting "set" in the execution-content selection field S24A. After this operation, the setting switching by using the remote controller 30 is valid.

Next, a control flow to change the function setting value in the priority switching mode for function settings will be described with reference to FIGS. 9 and 10.

First, a function selection screen S30A for performing various function settings of the indoor unit 20 is displayed to shift to a function selection mode (Step ST30). Subsequently, an address designation field S31A is used to designate an address of the indoor unit 20 as a target for setting switching (Step ST31), and a function setting field S32A is used to select a function setting No as a change target (Step ST32). It should be note that this control flow is similar to the control flow illustrated in FIG. 6.

Next, a function setting-value field S33A is used to select a function setting value (Step ST33). Then, in order to execute contents set in the processes at Steps ST31 to ST33, "set" is selected in an execution-content selection field S34A to determine the function setting value (Step ST34). The function setting value determined by the process at Step ST34 is transmitted to the indoor control board 210 of the indoor unit 20 by a remote control communication between the remote controller 30 and the indoor unit 20.

The indoor control board 210 receives the function setting value determined by using the remote controller 30. At that time, a process of checking the setting value of the function setting No. 32 indicating the priority switching setting regarding the function setting is performed in the indoor control board 210 (Step ST35). If the function setting value of the function setting No. 32 is "1", the settings with the DIP_SW 230a are valid and thus the setting contents set with the remote controller 30 are regarded as invalid so that the memory data related to the function setting value of the corresponding function setting No ("ceiling height setting" in the example of FIG. 10) in the indoor control board 210 is not updated (Step ST36). On the other hand, if the function setting value of the function setting No. 32 is "2", the settings with the remote controller 30 are valid and the data in the memory 240 related to the function setting value of the corresponding function setting No ("ceiling height setting" in the example of FIG. 10) in the indoor control board 210 is updated (Step ST37).

Next, a process flow when changing the setting content of the "ceiling height setting" of the "function setting No. 8" will be described next with reference to FIG. 11.

First, (1) in FIG. 11 illustrates a shipment setting state, for example. Specifically, this is a state where "1" is set as the function setting value of the "function setting No. 32", that is, a state where the settings with the DIP_SW 230a are validated. Moreover, the memory data of the "ceiling height setting" corresponding to the "function setting No. 8" is set to "2" indicating the "standard" setting.

Next, (2) in FIG. 11 illustrates a state where "2" is set as the function setting value of the "function setting No. 32", that is, a state where the settings with the remote controller 30 are validated. As to the memory data of the "ceiling height setting" corresponding to the "function setting No. 8", the "standard" setting, which is the initial state when the settings with the DIP_SW 230a settings has been validated, is maintained.

(3) in FIG. 11 illustrates an example in which the "ceiling height setting" corresponding to the "function setting No. 8" is changed by using the remote controller 30 under the above-mentioned condition. To describe specifically, in the state where the settings with the remote controller 30 are validated, the memory data of the function setting value of the "function setting No. 8" is rewritten to "3". That is, the "ceiling height setting" corresponding to the "function setting No. 8" is set to "high ceiling". Since "2" is set as the function setting value of the function setting No. 32 and the settings with the remote controller 30 are validated, when an instruction of changing the memory data of the function setting value to "3" is transmitted from the remote controller 30 to the indoor control board 210, the memory data of the function setting value in the indoor control board 210 is updated and the setting of the "ceiling height setting" is switched to the setting content of "high ceiling" that is instructed by the remote controller 30.

As described above, according to the air conditioner of the first embodiment, the switch for switching the function setting of the air conditioner and the memory for storing therein the setting value of the function setting are provided. The setting value stored in the memory can be rewritten according to an instruction from the remote controller. The function setting of the air conditioner is defined by the setting value stored in the memory. Therefore, regarding the function set in the air conditioner, priority as to whether to give priority to the setting with the switch or to validate the setting with the remote controller can be switched for each function according to setting from the remote controller.

Accordingly, for example, it is possible to perform the setting switching by using the switch on the control board, at a timing when units cannot be energized before completion of construction. On the other hand, in a case where the setting switching is performed at a time of a test operation after completion of installation or the setting switching is performed by a user, it is possible to perform the setting switching with the remote controller that is an operation not requiring to open an electric component box. That is, it is possible to select a setting means depending on an operator performing the function setting switching and an operation timing.

Furthermore, when the function setting value is changed with the remote controller and thereafter is to be returned to an initial setting state, the priority of the setting change can be changed from the remote controller setting to the switch setting. Therefore, returning to the initial setting value can be easily achieved.

Particularly, in a case where many air conditioners are installed in a building or the like, a timing of installing the indoor units differs from a timing of installing the outdoor units, and in many cases, wiring, pipe connection, function settings, and the like are performed in a non-energized state where only the indoor units are installed. In this case, the setting means based on the switch is convenient.

Second Embodiment

In the first embodiment, the case where the priority of the setting change is selected between the DIP_SW 230a and the remote controller 30 has been described. In a second embodiment, a mode where the priority of the setting change is not selected, and the setting switching with the remote controller 30 is always validated after the initial setting with the DIP_SW 230a will be described. This mode will be hereinafter appropriately referred to as "setting-switching remote-controller priority mode" or simply as "remote-controller priority mode".

An operation of an air conditioner according to the second embodiment is described next.

First, a control flow related to determination of the initial values of the function settings is identical or equivalent to processes in the first embodiment described with reference to FIGS. 3 to 5.

Figure 12:
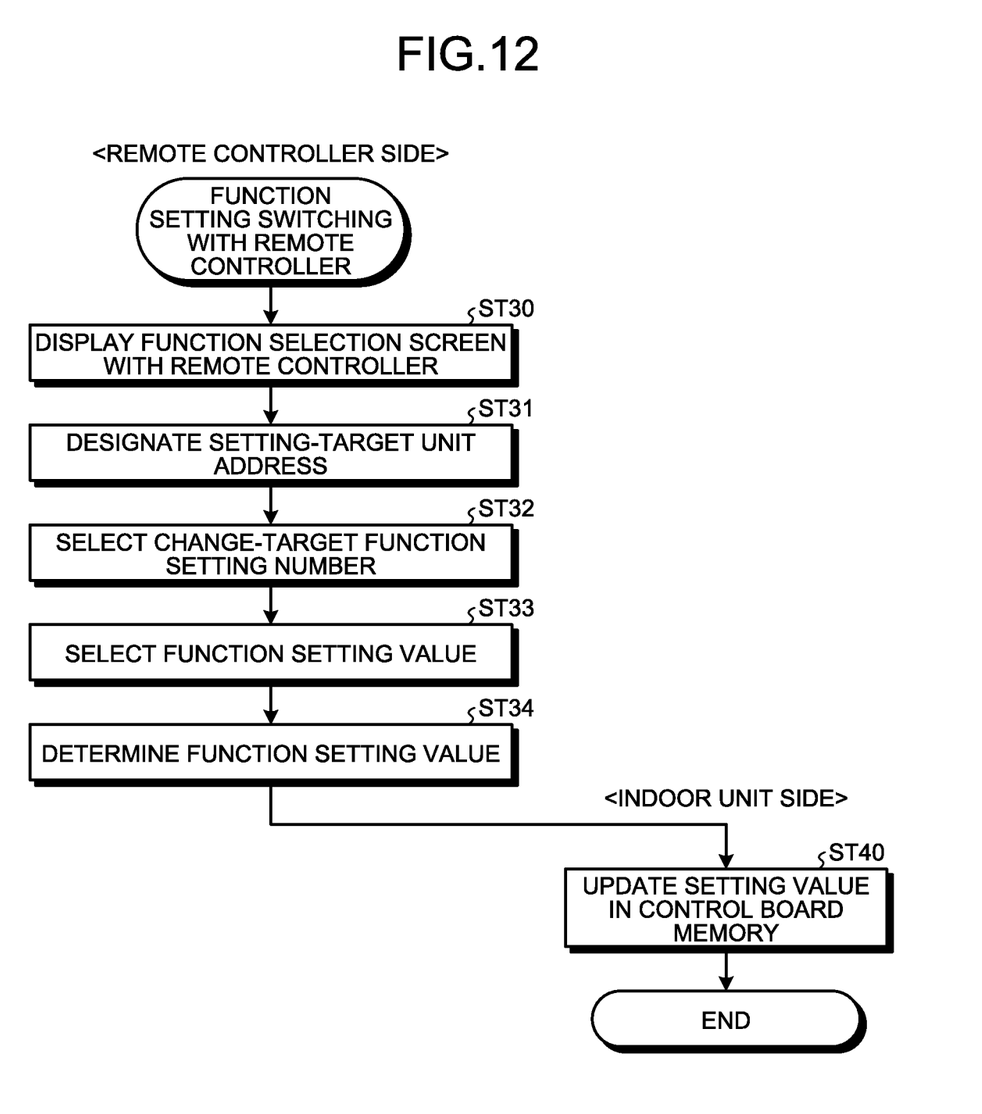
FIG. 12 is a flowchart illustrating a control flow at a time of changing a function setting value with a remote controller in a remote-controller priority mode according to a second embodiment.

FIG. 12 is a flowchart illustrating a control flow at a time of changing a function setting value with a remote controller in the remote-controller priority mode. In FIG. 12, the processes at Steps ST30 to ST34, that is, the operation of changing the function setting value by using the remote controller 30 is the same as that described with reference to FIG. 9 in the first embodiment.

The function setting value determined by the process at Step ST34 is transmitted by a remote control communication between the remote controller 30 and the indoor unit 20, and is received by the indoor control board 210 of the indoor unit 20. In the first embodiment, the process of checking the setting value of the function setting No. 32 indicating the priority switching setting regarding the function setting is performed. In the second embodiment, however, the remote-controller priority mode in which the setting switching with the remote controller 30 is always validated is performed. Therefore, determination of the priority switching is not performed. The function setting content set by using the remote controller 30 is validated, and thus the memory data related to the function setting value of the corresponding function setting No in the indoor control board 210 is updated (Step ST40).

In the second embodiment, as described above, with regard to the function settings of the air conditioner, both of a function of switching the setting values on the control board with the DIP_SW 230a mounted on the control board and a function of switching the setting values with the remote controller 30 are provided. Moreover, regarding the setting switching after the initial setting, the setting switching with the remote controller 30 is always validated.

There are a few cases where the settings are changed frequently. In many cases, changing of the function setting value is performed at the installation stage. Therefore, by adopting the configuration of the second embodiment where the setting switching with the remote controller 30 is always validated after the initial setting, it is possible to further simplify the setting switching operation with the remote controller after the installation.

Third Embodiment

In the first embodiment, the case where the priority of the setting change is selected between the DIP_SW 230a and the remote controller 30 has been described. In a third embodiment, a mode where the priority of the setting change is not selected, and a later-performed one of the setting switching with the DIP_SW 230a and the setting switching with the remote controller 30 is validated after the initial setting with the DIP_SW 230a will be described. This mode will be hereinafter appropriately referred to as "later-setting priority mode".

An operation of an air conditioner according to the third embodiment will be described next.

First, a control flow related to determination of the initial values of the function settings is identical or equivalent to processes in the first embodiment described with reference to FIGS. 3 to 5.

Figure 13:
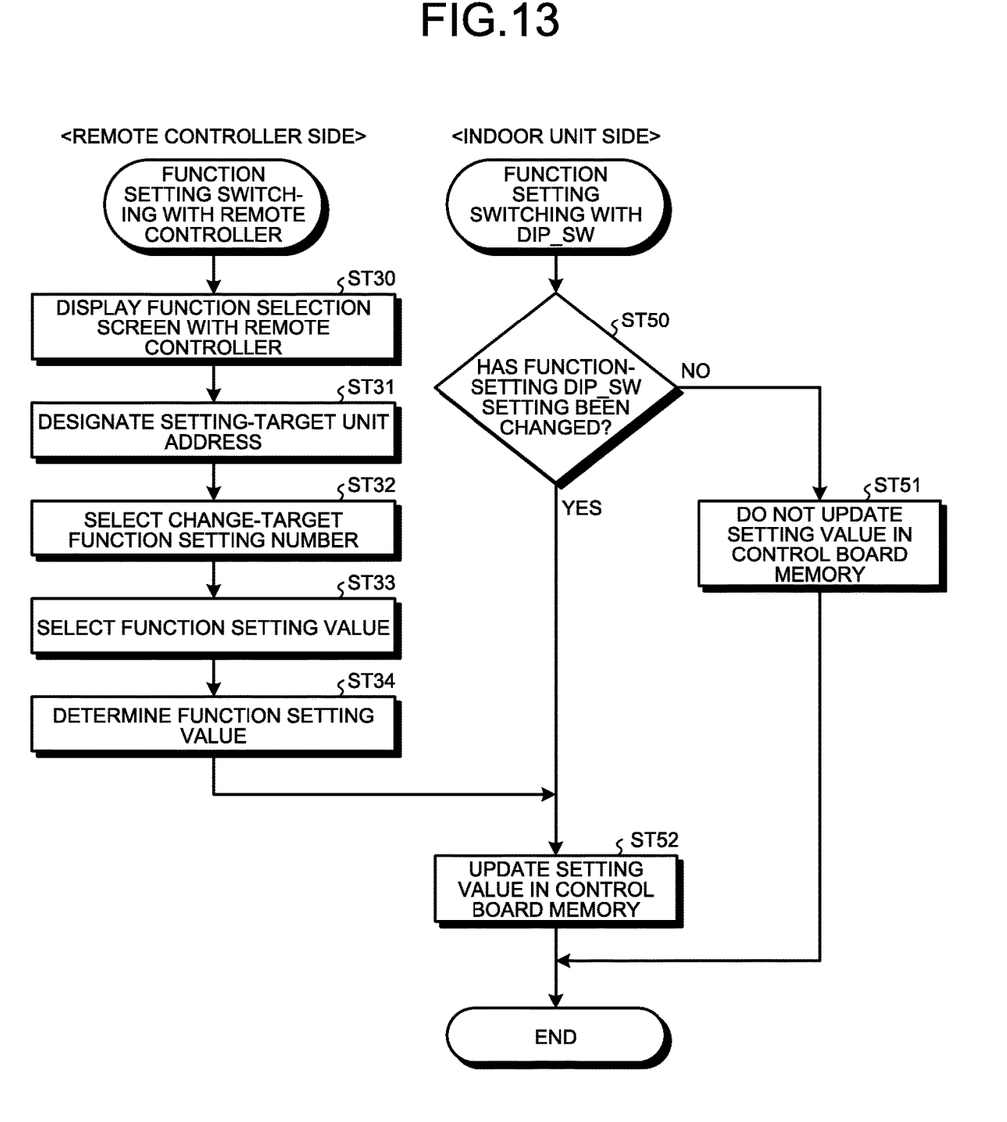
FIG. 13 is a flowchart illustrating a control flow at a time of changing a function setting value with a remote controller or a DIP_SW in a later-setting priority mode according to a third embodiment.

FIG. 13 is a flowchart illustrating a control flow at a time of changing the function setting value with the remote controller or the DIP_SW in the later-setting priority mode. In FIG. 13, the processes at Steps ST30 to ST34 and a process at Step ST52 are identical or equivalent to the processes at Steps ST30 to ST34 and the process at Step ST40 described with reference to FIG. 12 in the second embodiment.

Meanwhile, in the case of the flow of the third embodiment, the transition to the process of Step S52 is not only from Step S34 on the side of the remote controller 30 but also from Step S50 on the side of the indoor unit 20. To describe specifically, in the indoor unit 20, whether or not a setting change in the DIP_SW 230a related to the function settings is performed is determined in the indoor control board 210 (Step ST50). If the setting change is not performed (NO at Step ST50), the memory data in the indoor control board 210 is not updated (Step ST51), and the process ends. If the setting change is performed (YES at Step ST50), the memory data related to the setting value of the corresponding function in the indoor control board 210 is updated (Step ST52).

When the setting change with the remote controller 30 and the setting change with the DIP_SW 230a are performed, both processes are performed at Step ST52. In this case, when changing the setting value of an identical function is instructed, for example, the setting value instructed later in terms of time is validated as a final setting value.

Figure 14:
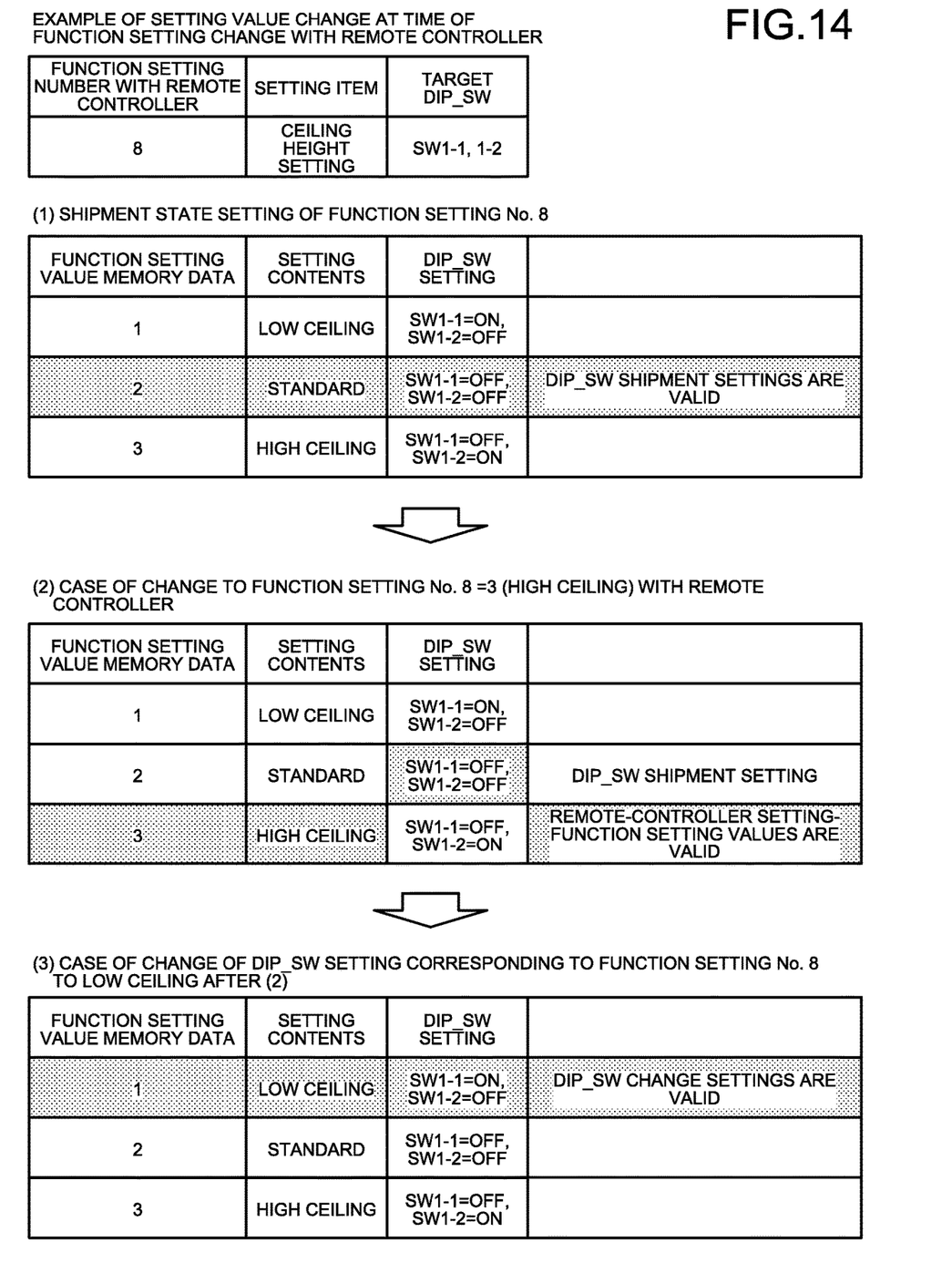
FIG. 14 is a diagram illustrating an example of a setting value change at a time of changing a function setting value in a later-setting priority mode after the flow illustrated in FIG. 13 is performed.

FIG. 14 is a diagram illustrating an example of the setting value change at a time of changing the function setting value in the later-setting priority mode after the flow illustrated in FIG. 13 is performed.

First, (1) in FIG. 14 illustrates initial setting values related to the "ceiling height setting" corresponding to the "function setting No. 8". The "standard" setting as the shipment setting state in the DIP_SW 230a is validated as the function setting value, and "2" is set as the function setting value of the "function setting No. 8".

Next, in (2) in FIG. 14, by using the remote controller 30, "3" is set as the function setting value of the "ceiling height setting" corresponding to the "function setting No. 8". The memory data of the function setting value in the indoor control board 210 is updated to the setting value from the remote controller 30, and the setting value of the "ceiling height setting" is effectively switched to the content indicating "high ceiling".

Next, (3) in FIG. 14 illustrates a case where the "ceiling height setting" is changed to the "low ceiling" setting by using the DIP_SW 230a of the indoor control board 210 after the above-mentioned (2). When the setting of the DIP_SW 230a is changed to the "low ceiling", the memory data of the function setting value in the indoor control board 210 also is updated and the setting value of the "ceiling height setting" is effectively switched to the content indicating "low ceiling".

As described above, with regard to the function settings of the air conditioner, both of a function of switching the setting values on the control board with the DIP_SW 230a mounted on the control board and a function of switching the setting values with the remote controller 30 are provided. Moreover, regarding the setting switching after the initial setting, the content of the setting change due to a later one of the setting switching with the DIP_SW 230*a* and the setting switching with the remote controller 30 is validated.

Timings at which the function settings are changed include a time of initial installation, a time of a change by a user after installation, a time of providing service, and the like. A setting change by a user is performed mostly with the remote controller 30. However, in a case where the setting switching is performed concurrently with other services at the time of providing service, the setting switching may be achieved by a setting change in the DIP_SW 230*a* on the indoor control board 210, when an electric component box is opened.

In the present configuration, whether the setting changing processing is performed by the setting changing with the DIP_SW 230*a* or by the setting changing with the remote controller 30, the setting performed later is validated. Therefore, the setting changing can be performed without considering the priority of setting switching or the like.

The configurations described in the foregoing embodiments are merely examples of the contents of the present invention and can be combined with other known techniques. It is also possible to omit or modify a part of the configuration without departing from the spirit of the invention.

The invention claimed is:

1. An air conditioner comprising:
   a remote controller; and
   an indoor unit,
   wherein the remote controller and the indoor unit are configured to be able to communicate with each other,
   wherein the indoor unit comprises:
   a switch configured to switch a plurality of different function settings of the air conditioner; and
   a memory configured to store therein a setting value of a function setting, of the plurality of different function settings, set by the switch,
   wherein the setting value stored in the memory responsive to setting by the switch is rewritable according to an instruction from the remote controller to switch the function setting set by the switch to a different function setting,
   the function settings of the air conditioner are defined by the setting values stored in the memory, and
   the setting value is (i) stored in the memory responsive to switching the switch, and (ii) rewritable according to an instruction from the remote controller.

2. The air conditioner according to claim 1,
   wherein an initial value regarding the function settings is set such that setting with the switch is validated, and
   wherein regarding switching of the function settings after the initial value is set, priority as to whether to give priority to setting with the switch or to validate setting with the remote controller is switched according to setting with the remote controller.

3. The air conditioner according to claim 1,
   wherein an initial value regarding the function settings is set such that setting with the switch is validated, and
   wherein regarding the function settings after the initial value is set, a setting change with the remote controller is always validated.

4. The air conditioner according to claim 1,
   wherein an initial value regarding the function settings is set such that setting with the switch is validated, and
   wherein regarding the function settings after the initial value is set, a later one of a setting change with the switch and a setting change with the remote controller is validated.

5. The air conditioner according to claim 1,
   wherein the remote controller comprises a remote controller processor, the remote controller processor is configured to
   selectably validate one of the switch and the remote controller as a priority.

6. The air conditioner according to claim 1,
   wherein the switch is a hardware switch configured to switch the plurality of function settings of the air conditioner.

7. The air conditioner according to claim 1,
   wherein the switch is a DP switch configured to switch the plurality of function settings of the air conditioner.

8. The air conditioner according to claim 1,
   wherein the indoor unit further comprises an indoor unit processor, the indoor unit processor is configured to
   check the setting value of the function setting set by the switch and store, in the memory, the checked setting value as a new setting value; and
   receive the instruction from the remote controller to switch the function setting set by the switch to the different function setting, and store, in the memory, a value of the instructed different function setting as the new setting value.

9. The air conditioner according to claim 1,
   wherein the remote controller comprises a remote controller processor, the remote controller processor is configured to
   select a function setting value and transmit, to the indoor unit, the instruction to switch the function setting to the selected function setting value.

10. The air conditioner according to claim 1, wherein
    the remote controller comprises a remote controller processor,
    the indoor unit further comprises an indoor unit processor,
    the remote controller processor is configured to
    select a function setting value and transmit, to the indoor unit, the instruction to switch the function setting to the selected function setting value,
    the indoor unit processor is configured to
    check the setting value of the function setting set by the switch and store, in the memory, the checked setting value as a new setting value; and
    receive the instruction from the remote controller to switch the function setting set by the switch to the different function setting, and store, in the memory, a value of the instructed different function setting as the new setting value.

11. The air conditioner according to claim 10,
    wherein an initial value regarding the function settings is set such that setting with the switch is validated, and
    wherein regarding switching of the function settings after the initial value is set, priority as to whether to give priority to setting with the switch or to validate setting with the remote controller is switched according to setting with the remote controller.

12. The air conditioner according to claim 10,
    wherein an initial value regarding the function settings is set such that setting with the switch is validated, and
    wherein regarding the function settings after the initial value is set, a setting change with the remote controller is always validated.

13. The air conditioner according to claim 10,
wherein an initial value regarding the function settings is set such that setting with the switch is validated, and
wherein regarding the function settings after the initial value is set, a later one of a setting change with the switch and a setting change with the remote controller is validated.

14. The air conditioner according to claim 10,
wherein the remote controller processor is further configured to
selectably validate one of the switch and the remote controller as a priority.

15. The air conditioner according to claim 10,
wherein the switch is a hardware switch configured to switch the plurality of function settings of the air conditioner.

16. The air conditioner according to claim 10,
wherein the switch is a DP switch configured to switch the plurality of function settings of the air conditioner.

* * * * *